US 6,678,364 B2

(12) United States Patent
Ruckart

(10) Patent No.: US 6,678,364 B2
(45) Date of Patent: Jan. 13, 2004

(54) SYSTEM AND METHOD FOR COST ESTIMATION OF A LONG DISTANCE CALL

(75) Inventor: John P. Ruckart, Atlanta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/876,015

(22) Filed: Jun. 7, 2001

(65) Prior Publication Data

US 2002/0085694 A1 Jul. 4, 2002

(51) Int. Cl.[7] ............................................. H04M 15/00
(52) U.S. Cl. .............................. 379/121.02; 379/114.28; 379/115.02; 455/406
(58) Field of Search ............................. 379/111, 114.01, 379/114.03, 114.05, 114.28, 115.01, 115.02, 120, 121.02, 121.03, 122, 127.04; 455/406, 408

(56) References Cited

U.S. PATENT DOCUMENTS

| | | | | |
|---|---|---|---|---|
| 4,726,056 A | * | 2/1988 | An et al. ................... 379/115 |
| 5,303,297 A | * | 4/1994 | Hillis ........................... 379/63 |
| 5,675,636 A | * | 10/1997 | Gray ...................... 379/114.15 |
| 5,748,717 A | * | 5/1998 | Chan et al. .................. 379/120 |
| 5,862,203 A | * | 1/1999 | Wulkan et al. .............. 379/114 |
| 5,873,030 A | * | 2/1999 | Mechling et al. ........... 455/408 |
| 5,881,138 A | * | 3/1999 | Kearns et al. .......... 379/114.02 |
| 5,920,613 A | * | 7/1999 | Alcott et al. ........... 379/114.02 |
| 5,991,380 A | * | 11/1999 | Bruno et al. ................. 379/115 |
| 6,104,792 A | * | 8/2000 | Lautenschlager et al. ... 379/114 |
| 6,154,533 A | * | 11/2000 | Foelker ....................... 379/201 |
| 6,188,751 B1 | * | 2/2001 | Scherer ........................ 379/88 |
| 6,195,543 B1 | * | 2/2001 | Granberg .................... 455/407 |
| 6,263,057 B1 | * | 7/2001 | Silverman .............. 379/114.02 |
| 6,473,499 B1 | * | 10/2002 | Ng et al. ............... 379/121.02 |
| 6,574,465 B2 | * | 6/2003 | Marsh et al. ................ 455/406 |

* cited by examiner

Primary Examiner—Binh Tieu
(74) Attorney, Agent, or Firm—Woodcock Washburn LLP

(57) ABSTRACT

The cost of a long distance call on a telephone system from a first telephone station to a second telephone station is estimated. The first telephone station has a corresponding calling number and the second telephone station has a corresponding called number. The called number, including a telephone code, is received from the first telephone station. The telephone code is parsed from the called number and a calling plan is determined. The cost is estimated based on the telephone code and the calling plan.

46 Claims, 6 Drawing Sheets

US 6,678,364 B2

SYSTEM AND METHOD FOR COST ESTIMATION OF A LONG DISTANCE CALL

FIELD OF THE INVENTION

The present invention generally relates to the field of telecommunications. More particularly, the present invention relates to a system and method for automatically estimating the cost of a long distance call.

BACKGROUND OF THE INVENTION

Today it is common to make long distance telephone calls to a wide variety of places and from a variety of different phones. For example, people regularly place long distance telephone calls to many different area codes within the United States and even to many different countries. As business becomes more global, the number of long distance telephone calls is likely to increase.

Furthermore, a person may use a variety of different phones to place long distance telephone calls. For example, many people have a telephone in their home, a telephone at their place of business, and a cellular telephone, all of which may be used to place long distance calls. To complicate things further, there are many different long distance calling plans having a variety of pricing agreements. Often, a person making a long distance telephone call does not know in advance how much the call will cost. To manually determine the cost of the telephone call, before actually making the call, may be time prohibitive.

In view of the foregoing, there is a need for a system and method for automatically estimating the cost of a long distance call.

SUMMARY OF THE PRESENT INVENTION

The present invention is directed to automatically estimating the cost of a long distance telephone call.

According to one aspect of the present invention, a method is provided for estimating the cost of a long distance telephone call from a first telephone station having a corresponding calling number to a second telephone station having a corresponding called number. The estimation method is activated by dialing a predefined telephone number. The called number, including a telephone code, is received from the first telephone station and a telephone code is parsed from the called number. A calling plan is determined based upon the calling number and the estimated cost is determined based upon the telephone code and the calling plan. In an alternate embodiment, the estimation method is activated by dialing a predefined prefix, such as, for example, '818' in addition to the called number.

According to another aspect of the present invention, a system for estimating the cost of a long distance call is implemented on an Advanced Intelligent Network (AIN) based wire line telephone system. The AIN telephone system includes a service switching point electrically coupled to the first telephone station, a service control point adapted to communicate with the service switching point, and a service node. The service control point contains a data store and executes a service package application. The service node is electrically coupled to the service switching point and to the service control point. The service node is adapted to receive a called number from the first telephone station and forward the called number to the service package application. The service package application parses the telephone code from the called number, determines a calling plan identification, and determines the estimated cost based on the telephone code and the calling plan identification.

According to a further aspect of the present invention, a system for estimating the cost of a long distance call is implemented on a Wireless Intelligent Network (WIN) based wireless telephone system. The wireless telephone system includes a mobile switching center electrically coupled to the first telephone station, a service control point adapted to communicate with the mobile switching center, and a service node. The service control point contains a data store and executes a service package application. The service node is electrically coupled to the mobile switching center and to the service control point. The service node is adapted to receive a called number from the first telephone station. The service package application parses the telephone code from the called number, determines a calling plan identification, and determines the estimated cost based on the telephone code and the calling plan identification.

The above-listed features, as well as other features, of the present invention will be more fully set forth hereinafter.

BRIEF DESCRIPTION OF THE DRAWINGS

The present invention is further described in the detailed description that follows, by reference to the noted plurality of drawings by way of non-limiting illustrative embodiments of the present invention, in which like reference numerals represent similar parts throughout the several views of the drawings, and wherein.

DETAILED DESCRIPTION OF ILLUSTRATIVE EMBODIMENTS

The present invention is directed to automatically estimating the cost of a long distance telephone call. The present invention may be implemented on an Advanced Intelligent Network (AIN) based wire line telephone system.

AIN Overview

An AIN is a particular type of telephone system with intelligent devices that handle the messaging and routing of calls. In addition, these intelligent devices may also provide enhanced features. These intelligent devices were first developed and implemented in late 1970's and early 1980's to address the inefficiencies of the then existing telephone system.

In a wire line telephone system without AIN capabilities, central offices (CO), described below, are interconnected by trunk lines. Trunk lines provide for voice and/or data communication, including for example, telephone calls between telephone users or data between fax machines. However, the COs also use the trunk lines to signal each other for messaging and routing information, as well as for communication. The COs use multi-frequency signaling that occupies bandwidth on the trunk lines, which could otherwise be used for communication. The term "communication" or "call" is used herein to include messages that may be exchanged between a calling party and a called party over a telephone system.

In a wire line telephone system with AIN capabilities, intelligent devices are included in the telephone system to perform messaging and routing without using the trunk lines, thereby allowing more communication over the trunk lines. Additionally, because these intelligent devices are programmable, they provide the ability for enhanced features. In an AIN wire line telephone system, COs are replaced with service switching point (SSP) central offices, which are central offices that include intelligent network functionality, allowing the SSPs to communicate with the intelligent devices. Preferably, an AIN system with at least AIN Release 0.2 is utilized to implement the various features and aspects of the present invention.

Figure 1:
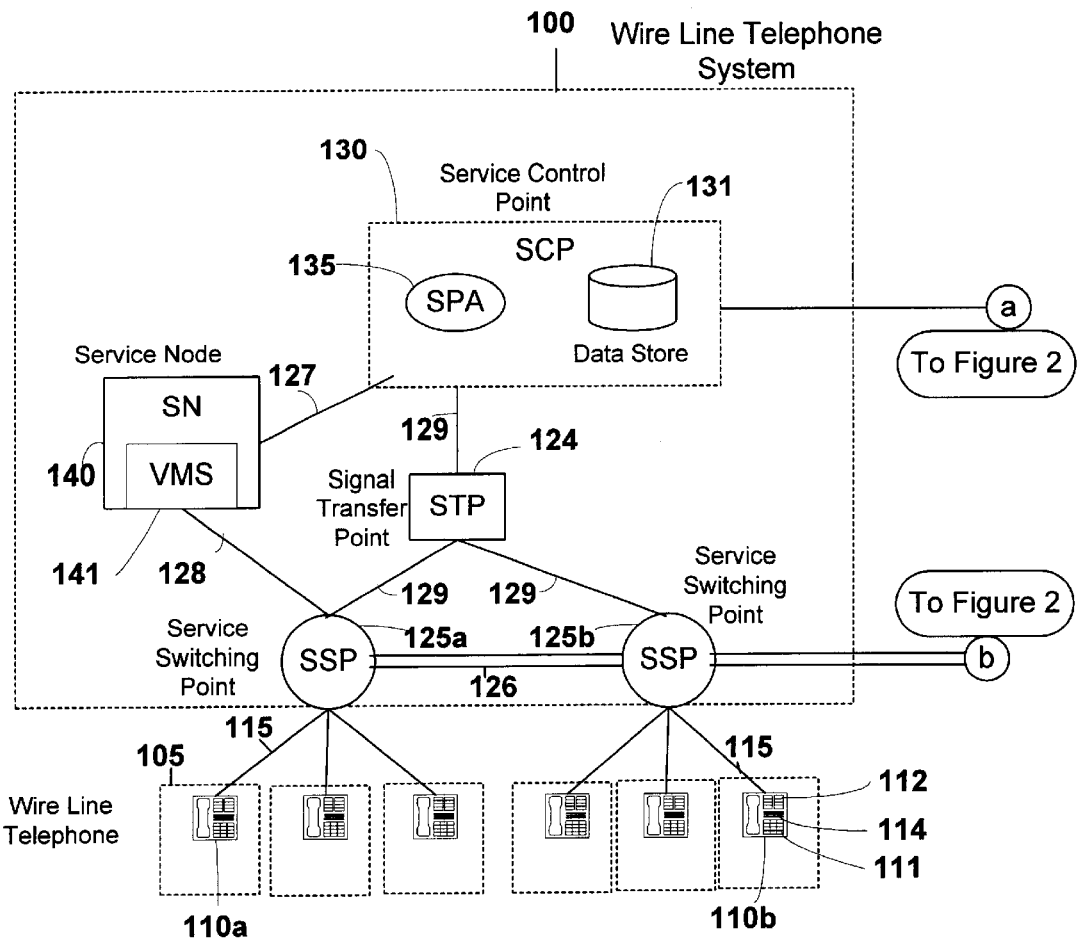
FIG. 1 is a block diagram of an exemplary Advanced Intelligent Network (AIN) based wire line telephone system, with which the present invention may be employed.

FIG. 1 is a block diagram of an exemplary AIN based wire line system. As shown in FIG. 1, an AIN wire line telephone system 100 includes at least one service control point (SCP) 130, at least one signal transfer point (STP) 124, at least one service switching point central office (SSP), shown as 125a, 125b (commonly referred to hereinafter as 125), and a plurality of subscriber locations 105. Optionally, the wire line telephone system 100 may include at least one service node (SN) 140.

Subscriber locations 105 include telephone stations, which may be a wire line telephone 110. Although wire line telephones 110 are illustrated as the telephone stations in FIG. 1, such stations may also include facsimile machines, computers, modems, and the like. Wire line telephones 110 include a telephone keypad 111 and may include indicating lamps 112 and a graphical display 114.

Subscriber locations 105 are connected to SSP 125 via telephone lines 115 (e.g., plain old telephone service (POTS), or the like). A telephone line 115 may also be referred to as a calling line and the terms will be used interchangeably hereinafter. Each SSP 125 serves a designated group of calling lines, and thus, the SSP that serves a particular calling line may be referred to as its serving switch or local SSP. Alternatively, subscriber locations 105 may be connected to a private branch exchange (not shown), before connecting to SSP 125. Each active calling line in an AIN is assigned a ten digit telephone number. The term "telephone number" is used in its generally understood meaning to be the number which is dialed or input into telephone keypad 111 by a calling party or source to reach a telephone station on a calling line associated with the dialed telephone number. A telephone number associated with wire line telephone system 100 is referred to herein as a wire line number. A telephone number associated with a wireless telephone system (e.g., wireless telephone system 200 described below with respect to FIG. 2) is referred to herein as a wireless number.

A party making a telephone call is referred to as the calling party and the party intended to be reached is referred to as the called party. The telephone number of the calling party is the calling number. The telephone number of the called party is the called number. In a typical application, when a calling party dials a called number, SSP 125 of the calling number (e.g., the calling or originating SSP 125a), connects to SSP 125 (e.g., the called or terminating SSP 125b) of the called number, over trunk lines 126. SSP 125 of the calling number rings the wire line telephone 110 of the called number.

SSPs 125 are each programmable switches which recognize AIN-type calls, launch queries to intelligent devices in the AIN, receive commands and data from the intelligent devices within the AIN to further process and route calls, and can be configured with triggers, which are more fully described below, to initiate AIN actions.

SSPs 125 are also connected to another type of AIN element referred to as a STP 124 via respective data links 129. Currently, data links 129 employ a signaling protocol referred to as Signaling System 7 (SS7), which is described in a specification promulgated by the American National Standards Institute (ANSI). The SS7 protocol is a layered protocol, which employs data packets, synonymously referred to as packets, information packets, message packets, or messages. A data packet includes a beginning header, an ending header, and error checking bits.

STPs 124 perform messaging and routing functions between SSPs 125 and SCP 130 on an AIN network. Each SSP 125 is directly connected to a STP 124, which is its local STP 124. Each STP 124 may be connected to several SSPs 125. If SSP 125 sends a message to another intelligent device on the AIN, SSP 125 will first send the message to its local STP 124. STP 124 will read the message and determine where to route the message. Typically, STP 124 will send the message to SCP 130. SCP 130 will then process the message and send a reply message to the appropriate STP 124. STP 124 will then read the reply message and send that reply message to the appropriate SSP 125.

Much of the intelligence of the AIN resides in SCP 130, which includes a data store 131, and is connected to STP 124 over data link 129. Typically, SCP 130 is also the repository of service package applications (SPA) 135 that are used in connection with or as part of the data store 131 in the application of telecommunication services or enhanced features to calling lines. SPAs 135 reside on SCP 130 and provide the programmable device with intelligence to process calls and queries sent from SSPs 125 and other AIN devices. SCP 130 receives messages from devices within wire line telephone system 100, processes the messages according to SPA 135, and returns a reply message to the appropriate device in telephone system 100. The messages may include routing requests and/or enhanced features. An example of an enhanced feature available from SPA 135 is caller identification. In caller identification, the called party receives the identification (e.g., the calling number) of the calling party along with the call.

The AIN may also include an SN 140, which is an interactive data system that may act as a switch to transfer calls, recognize telephone keypad inputs and voice commands, provide voice synthesis, and/or store messages. SN 140 includes both voice and dual tone multi-frequency (DTMF) signal recognition devices and voice synthesis devices and therefore can respond to both voice commands and telephone keypad 111 commands. In addition, SN 140 may include a data assembly interface and a data storage device. The data storage device may be used to store audio messages. SN 140 may provide interactive help, collect voice information from calls, track calls, and provide indication, announcement, and messaging functions.

Voice messaging system 141 is preferably included in SN 140, although it may be located elsewhere, such as within the SCP 130 or as a standalone system. Voice messaging system 141 may receive and store messages. Voice messaging system 141 may provide prompts, which are preferably, voice synthesized. Voice messaging system 141 may recognize telephone keypad inputs and voice commands, dial telephone numbers, and deliver messages.

SN 140 is connected to SCP 130 over data link 127. This connection is typically accomplished with an X.25 protocol or TCP/IP. In addition, SN 140 typically is connected to one or more SSPs 125 via Integrated Service Digital Network (ISDN) data links as shown by the data link 128 between SSP 125*a* and SN 140.

In order to keep the processing of data and calls as simple as possible, a relatively small set of triggers may be defined for each SSP 125. Specific triggers may also be defined for each telephone number. A trigger is an event that generates a message to be sent to a device within the AIN. For example, the trigger may cause SSP 125 to send a query message to SCP 130 requesting instructions to process the call. SCP 130 may then query data store 131 for processing instructions with respect to a particular call. The results of the database inquiry are sent back to SSP 125 in a response from SCP 130 through STP 124. The return message may include call processing instructions to SSP 125. The instructions may command SSP 125 to take some special action as a result of a customized calling service or enhanced feature, for example, forwarding a call to a voice messaging system. In response, SSP 125 may move through its call states, collect telephone keypad inputs, generate further messages, or route calls to complete the command issued by SCP 130.

Various triggers can by configured for each telephone number or for each SSP 125. Triggers may be configured to affect either the calling party or the called party, or both. For example, an Off-hook Trigger may be set on the calling number. If this trigger is set, SSP 125 initiates a query to SCP 130 every time that calling number line is taken off-hook. SCP 130 then processes the query to determine how the call should be processed and replies to SSP 125 with instructions on how the call should be processed. Alternatively, a trigger may be set on the called line number which will trigger an AIN message to be sent.

Wireless Overview

Figure 2:
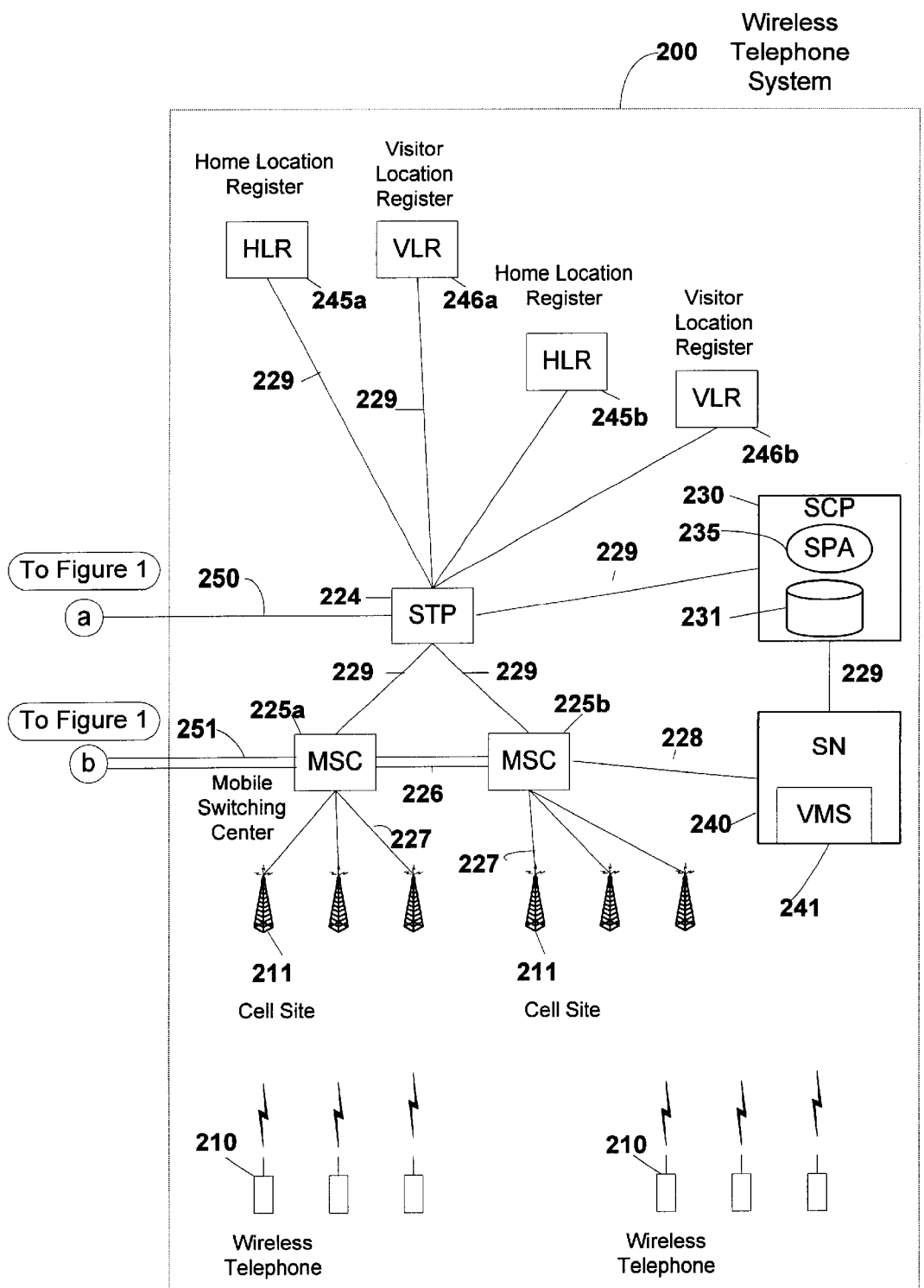
FIG. 2 is a block diagram of an exemplary wireless telephone system, with which the present invention may be employed.

FIG. 2 illustrates, in block diagram form, a wireless telephone system 200. As shown in FIG. 2, wireless telephone system 200 includes a plurality of wireless phones 210, a plurality of cell sites 211, at least one mobile switching center (MSC) shown as 225*a* and 225*b* (commonly referred to as 225), a plurality of home location registers (HLR) shown as 245*a* and 245*b* (commonly referred to as 245), and a plurality of visitor location registers (VLR) shown as 246*a* and 246*b* (commonly referred to as 246), wherein each MSC 225 has an associated HLR 245 and a VLR 246. Optionally, wireless telephone system 200 includes a signal transfer point (STP) 224.

Wireless telephones 210 communicate with cell sites 211. Each cell site 211 covers a particular geographic region called a cell, including overlap between cell sites 211. Cell sites 211 are located to maximize the geographic area that wireless telephone users have to access wireless telephone system 200. Cell sites 211 may include sending capability and/or receiving capability and each cell site 211 has a limited number of speech (i.e., data) channels available for communication and at least one control channel for sending and receiving messaging and routing commands. Wireless telephone 210 may request a speech channel from cell site 211 by sending a message over a control channel. Cell site 211 may or may not grant the request depending on current speech channel occupancy.

After wireless telephone 210 has been granted a speech channel, as wireless telephone 210 moves from one cell site to another cell site, MSC 225 tracks the move and allowing wireless telephone 210 to maintain communications with wireless telephone system 200.

MSCs 225 are interconnected by a plurality of trunk circuits 226. MSCs 225 are also connected to wire line telephone system through at least one trunk circuit 251. MSCs 225 communicate with cell sites 211 through conventional data links 227. Preferably, base stations (not shown) are connected between cell sites 211 and MSCs 225.

Each wireless telephone 210 has one MSC 225 assigned as its home MSC 225. Each MSC 225 has an associated HLR 245 and a VLR 246. Each HLR 245 keeps data on each of the wireless telephones assigned to the HLR 245. Included in the data residing in HLR 245 is the on/off status of each wireless telephone 210 assigned to HLR 245.

When wireless telephone 210 tries to communicate with wireless telephone system 200 through MSC 225 that is not the user's home MSC 225, the user is still allowed access to wireless telephone system 200. However, in this instance, wireless telephone 210 is considered a visiting wireless telephone and is tracked and monitored by VLR 246. VLR 246 reports information about the visiting wireless telephone to HLR 245 assigned to the wireless telephone 210, including the on/off status of the visiting wireless telephone.

Triggers may also be set in wireless telephone system 200. Triggers may be set for each MSC 225 or for each wireless telephone number. Triggers in wireless telephone system 200 operate similarly to triggers in wire line telephone system 100. For example, MSC 225 may request HLR 245 for call processing instructions. The reply instructions from HLR 245 may command MSC 225 to take some special action as a result of a customized calling service or enhanced feature, for example, forwarding the call to a voice messaging system. In response, MSC 225 may move through its call states, collect telephone keypad inputs, generate further messages, or route calls necessary to complete the command issued by HLR 245.

Various triggers can by configured in wireless telephone system 200. Triggers may be configured to affect either the calling party or the called party, or both. Triggers may be set on a per telephone number basis or on a per MSC 225 basis.

Wire line telephone system 100 may communicate data with wireless telephone system 200 over a data link 250. SCP 130 may be connected to an STP 224 in wireless line telephone system 200. Data link 250 may be implemented with an SS7 protocol, as described above. In this manner, SCP 130 of wire line telephone system 100 can communicate with any HLR 245 within wireless telephone system 200. Alternatively, SCP 130 may be connected to each HLR 245 in wireless telephone system 200 (not shown). Again, data link 250 may be implemented with an SS7 protocol.

Wireless telephone system 200 may include an SCP 230 connected to STP 224 over a data link 229. SCP 230, which functions similar to SCP 130, may be used to provide enhanced features to wireless telephone system 200. An SN 240 may be connected to SCP 230 via a data link 229, and may be connected to MSC 225 via a data link 228. SN 240, which functions similar to SN 140, may be used to provide enhanced features to wireless telephone system 200, including voice messaging features via VMS 241. When intelligent devices, such as SCP 230 and/or SN 240 are added to wireless telephone system 200, it is referred to as a wireless intelligent network (WIN).

Estimating Cost of a Long Distance Call

Figure 3:
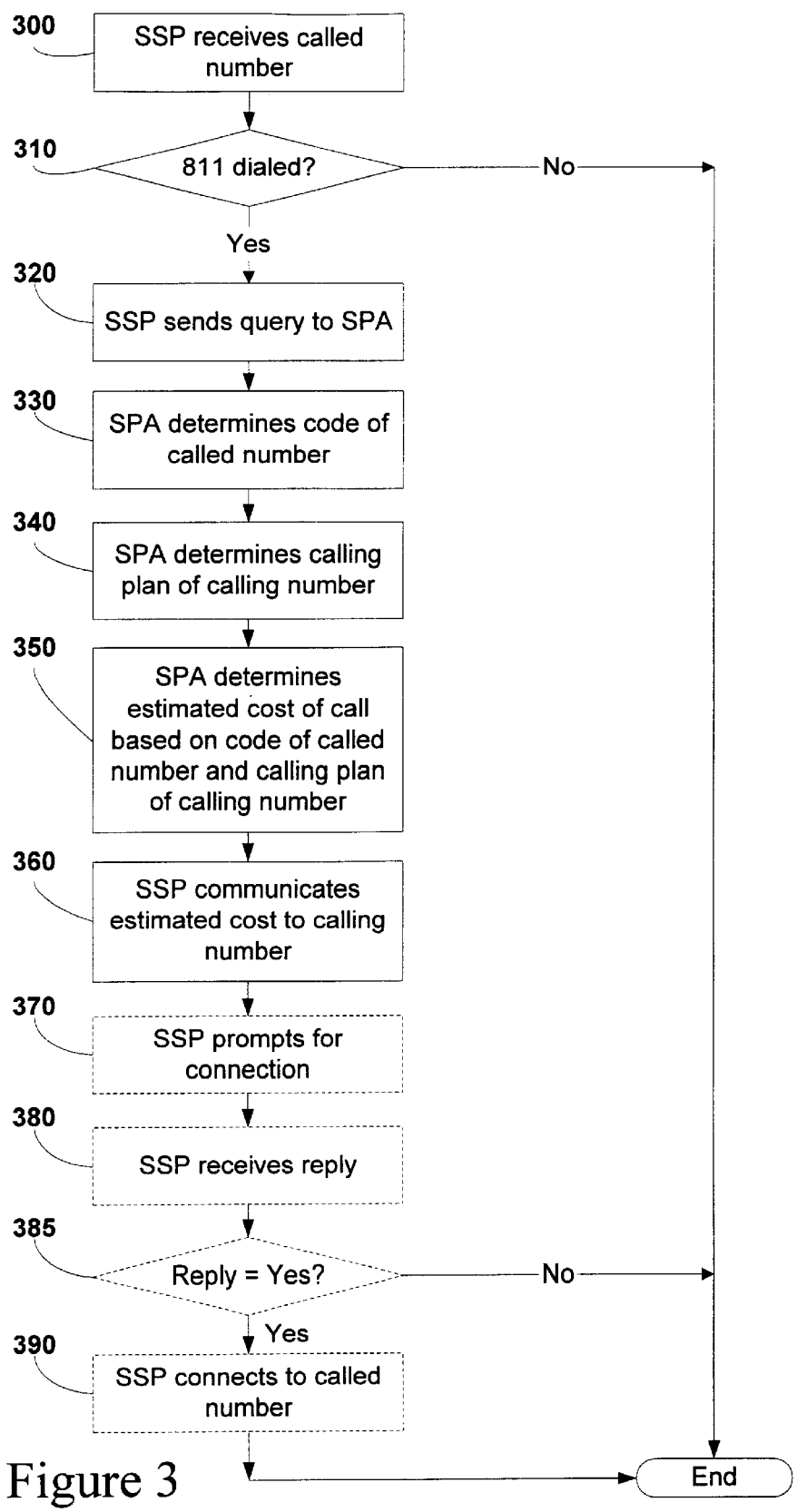
FIG. 3 is a flow diagram of a method in accordance with one embodiment of the present invention.

FIG. 3 is a flow chart of a method for automatically estimating a cost of a long distance telephone call, in accordance with an embodiment of the present invention. In the embodiment of FIG. 3, the invention is implemented on AIN wire line telephone system 100 of FIG. 1 and the call has been made on wire line telephone 110a, though it is contemplated that the call can be made from any telephone, in any type of intelligent telephone system.

As shown in FIG. 3, at step 300, a calling party takes wire line telephone 110a (i.e., the telephone having the calling number) off-hook and dials a telephone number. SSP 125a receives the dialed number (i.e., the called number) from wire line telephone 110a.

During typical calling conditions, the called number is a ten digit phone number comprising a first field containing a '1,' a second field containing a telephone code such as an area code, country code, or the like, and a third field containing a telephone number. For example, a called number of 1-987-6543210 has a first field containing '1,' a second field containing '987,' and a third field containing '6543210.' '987' is the telephone code and '6543210' is the telephone number. However, in this embodiment, the second field of the called number includes two sub-fields. The first sub-field contains a predefined prefix, such as, for example, '811.' The second sub-field contains the telephone code. For example, the dialed number may be 1-811987-6543210. In this manner, the predefined prefix may activate wire line telephone system 100 to implement the present invention, rather than processing the telephone call as a conventional telephone call.

In this embodiment, SSP 125a is adapted to receive more than ten digits from telephone 110a so that wire line telephone system 100 can connect the telephone having the called number to the telephone having the calling number as described below in optional steps 370 through 390. Alternatively, SSP 125a is not adapted to receive more than ten digits from telephone 110a; however, in this case, wire line telephone system 100 does not connect the telephone having the called number to the telephone having the calling number, as is described below in optional steps 370 through 390.

At step 310, SSP 125a responds based on the called number. If the first subfield of the second field of the called number does not contain the predefined prefix of '811,' SSP 125a processes the telephone call as a conventional telephone call. For example, SSP 125a attempts to connect to the telephone having the called number. Alternatively, if the second field of the called number contains the prefix '811,' the method proceeds to step 320.

At step 320, SSP 125a sends a query to SPA 135 of SCP 130. The query includes the called number and the telephone number of wire line telephone 110a (i.e., the calling number).

At step 330, SPA 135 receives the query from SSP 125a and parses the called number and the calling number from the query. Additionally, SPA 135 parses a telephone code (e.g., the area code) from the called number.

At step 340, SPA 135 determines the calling plan of the calling number. In this illustrative embodiment, this is accomplished by referencing a table of data containing call plan information. For example, SPA 135 may read a data table such as is shown in FIG. 4 to determine the calling plan.

Figure 4:
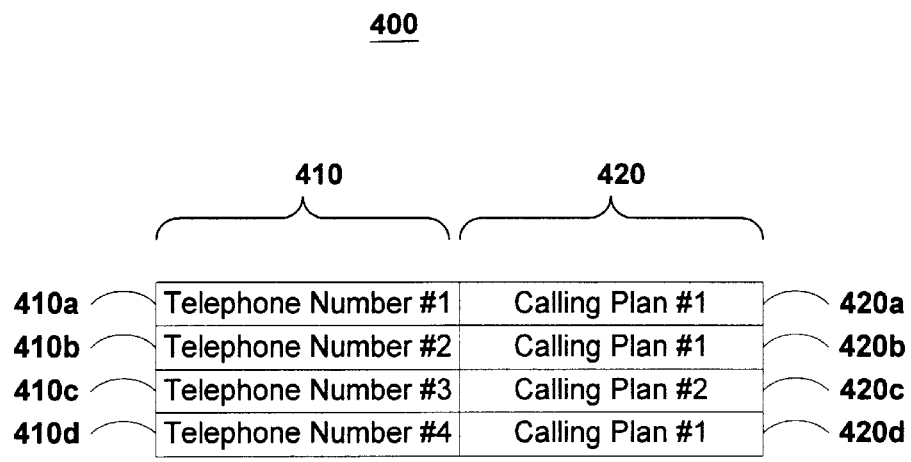
FIG. 4 is a data structure in accordance with one embodiment of the present invention, for use with the method of FIG. 3.

As shown in FIG. 4, data table 400 includes a first segment 410 and a second segment 420. The first segment 410 includes a plurality of data fields 410a through 410d, wherein each data field contains a telephone number. The second segment 420 includes a plurality of data fields 420a through 420d, wherein each data field contains a calling plan identification. Each data field of first segment 410 corresponds to a data field of second segment 420, thereby forming a mapping between telephone numbers and calling plans. As shown in FIG. 4, 'telephone number #1' corresponds to 'calling plan #1,' 'telephone number #2' corresponds to 'calling plan #1,' 'telephone number #3' corresponds to 'calling plan #2,' and 'telephone number #4' corresponds to 'calling plan #1.' In the present embodiment, the calling plan is determined based upon a data table, however, it is contemplated that the calling plan may be determined based upon any data structure mapping between telephone numbers and calling plans such as a relational database, a distributed database, a file, a spreadsheet, and the like.

Referring back to step 340 of FIG. 3, if the calling number is 'telephone number #3,' SPA 135 searches first segment 410 of data table 400 for 'telephone number #3.' Once 'telephone number #3' is read in data field 410c, SPA 135 reads the corresponding calling plan identification contained in data field 420c, or 'calling plan #2.'

At step 350, SPA 135 determines an estimated cost of the telephone call. In this illustrative embodiment, this is accomplished by referencing a table of data containing estimated cost information. For example, SPA 135 may determine the estimated cost by reading a data table such as is shown in FIG. 5.

Figure 5:
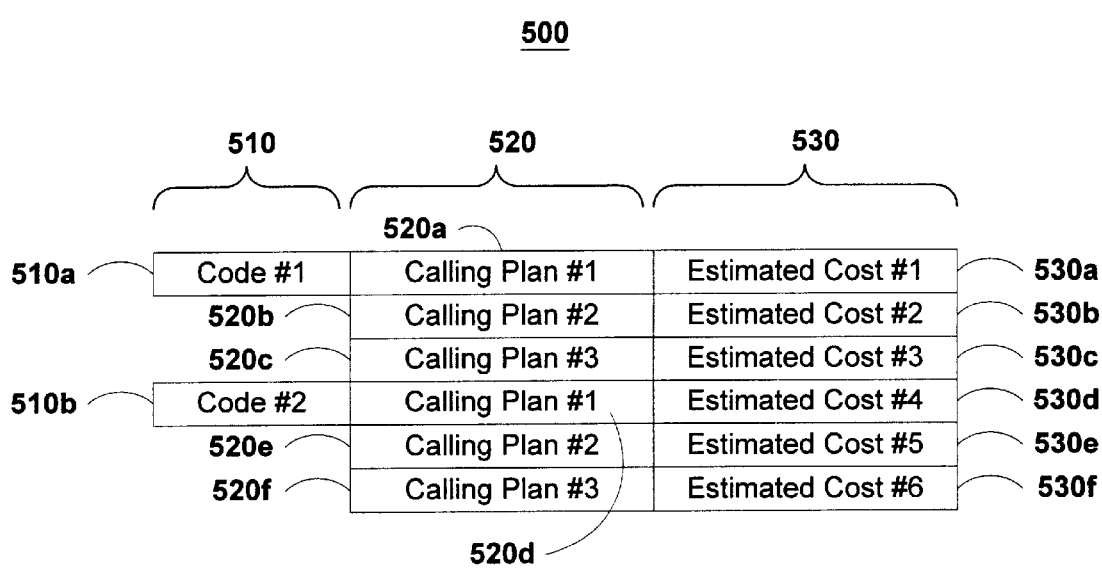
FIG. 5 is another data structure in accordance with one embodiment of the present invention, for use with the method of FIG. 3.

As shown in FIG. 5, data table 500 includes a first segment 510, a second segment 520, and a third segment 530. First segment 510 includes a plurality of data fields 510a through 510b, wherein each data field contains a telephone code representing, for example, an area code or a country code. Second segment 520 includes a plurality of data fields 520a through 520f, wherein each data field contains a calling plan identification, and each data field of second segment 520 corresponds to a data field of first segment 510. As shown, first segment includes two data fields 510a and 510b containing 'code #1' and 'code #2,' respectively. Data fields 520a through 520c of second segment 520 correspond to data field 510a of first segment 510, and data fields 520d through 520f correspond to data field 510b of first segment 510. Thus, in the present embodiment, multiple data fields of second segment 520 correspond to a single data field of first segment 510.

Third segment 530 includes a plurality of data fields 530a through 530f, wherein each data field contains an estimated cost and each data field of third segment 530 corresponds to a data field of second segment 520. Data fields 530a through 530f correspond to data fields 520a through 520f, respectively. In this manner, a telephone code and a calling plan are mapped to an estimated cost.

In the present embodiment, the estimated cost is determined based upon a data table, however, it is contemplated that the calling plan may be determined based upon any data structure mapping from a telephone code and a calling plan to an estimated cost such as a relational database, a distributed database, a file, a spreadsheet, and the like. Also, first segment 510 of data table 500 may be optional. For example, if a calling plan has a cost that does not vary with the destination of the call, the telephone code may be disregarded and a single mapping from a calling plan to an estimated cost may be used.

Referring back to step 350 of FIG. 3, if the determined calling plan is 'calling plan #2' and the telephone code is 'code #2,' SPA 135 searches first segment 510 of data table 500 for 'code #2.' Once 'code #2' is read in data field 510b, SPA 135 searches through the portion of second segment 520 that correspond to data field 510b (i.e., data fields 520d through 520f) for 'calling plan #2.' Once 'calling plan #2' is read in data field 520e, SPA 135 reads the corresponding entry in data field 530e which contains the entry 'estimated cost #5.'

At step 360, SPA 135 sends a message to SSP 125a containing the estimated cost. SSP 125a receives the message and communicates the estimated cost to wire line telephone 110a. Preferably, the communication is accomplished with audible voice synthesis. For example, SSP 125 may communicate to wire line telephone 110a "The cost to complete this call is estimated at ['estimated cost #5']." Alternatively, the communication is accomplished by sending text to graphical display 114 of wire line telephone 110a.

At optional step 370, SSP 125a broadcasts a prompt to the telephone having the calling number for the calling party to select whether to connect the call to the telephone having the called number. For example, SSP 125a may broadcast a prompt with audible voice synthesis, such as "Press '1' on the keypad or say 'Yes' to be connected to the called number." The calling party may reply by using either a telephone keypad or through voice recognition and processing techniques.

At optional step 380, SSP 125a receives a reply to the prompt. The reply may be in the form of a keypad input or a voice command.

At optional step 385, SSP 125a responds based on the reply to the prompt. If the reply is 'No,' then SSP 125a ends the call processing such as providing a dial tone. If the reply is 'Yes,' for example, a received keypad entry of '1' or a received spoken 'Yes,' then SSP 125a proceeds to step 390.

At optional step 390, SSP 125a connects to the telephone having the called number. In the present embodiment, in order for SSP 125a to connect to the called number, SSP 125a inputs more than ten digits at step 300. That is, SSP 125a inputs the ten digit telephone number and the '811' prefix.

In an alternate embodiment of the present invention, at step 360, SPA 135 first sends a command to SSP 125a to connect to SN 140. When SSP 125a connects to SN 140, SN 140 communicates the estimated cost to wire line telephone 110a. In this alternate embodiment, SN 140 also performs optional steps 370 through 380, rather than SSP 125a.

Figure 6:
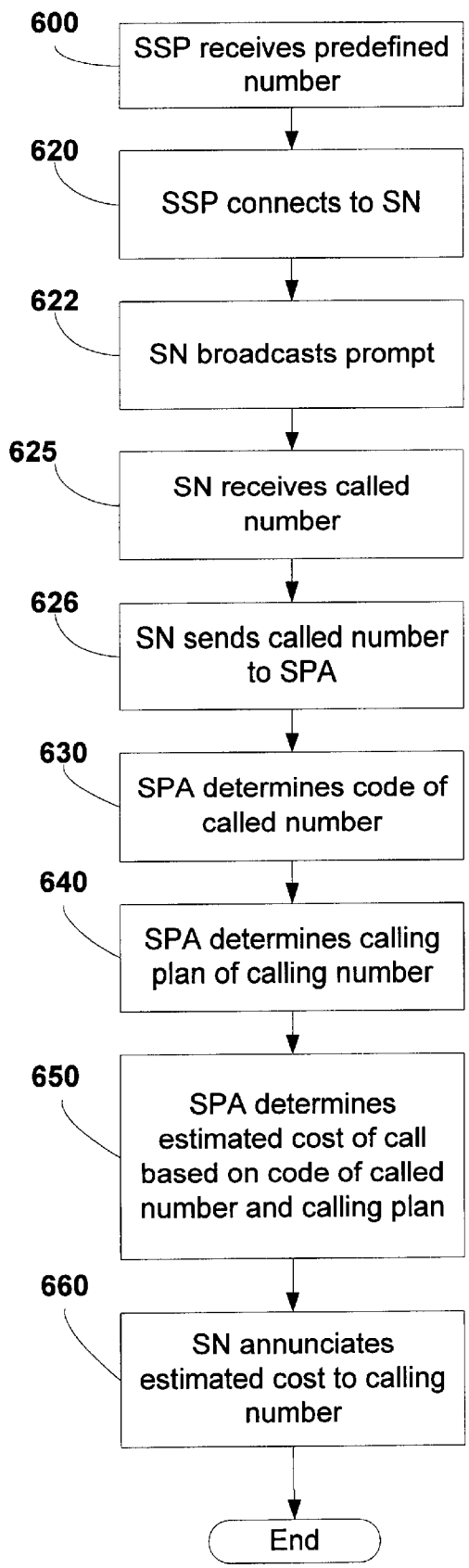
FIG. 6 a flow diagram of a method in accordance with another embodiment of the present invention.

In another embodiment of the present invention, instead of using a predefined prefix to activate the long distance call estimation, as described in connection with FIG. 3, a predefined telephone number is dialed, as illustrated in FIG. 6. In this embodiment, SSP 125a is not adapted to receive more than ten digits from telephone 110a. As shown in FIG. 6, at step 600, a calling party takes wire line telephone 110a off-hook and dials a predefined telephone number. SSP 125a receives the predefined number from wire line telephone 110a. At step 620, SSP 125a connects to SN 140. Since SN 140 may not be connected to every SSP 125 in a wire line telephone system, SN 140 may connect to the SSP 125 of the calling line via other SSPs 125. In this embodiment, the predefined number corresponds to a group line number of SN 140. The group line number is one telephone number that is mapped to a plurality of telephones lines electrically coupled to SN 140. In this manner, multiple calling parties may simultaneously access SN 140 via the plurality of telephone lines.

At step 622, SN 140 broadcasts a prompt to telephone 110a for the called number, preferably with audible voice synthesis.

At step 625, SN 140 receives the called number from the telephone having the calling number. The called number is a ten digit phone number comprising a first field containing a '1', a second field containing a telephone code, and a third field containing a telephone number. In this embodiment, second field does not contain a sub-field for a predefined prefix.

At step 626, SN 140 sends the called number to SPA 135 of SCP 130.

At step 630, SPA 135 receives the called number from SN 140 and parses the telephone code from the called number.

At step 640, SPA 135 determines the calling plan of the calling number. In this illustrative embodiment, SPA 135 determines the calling plan of the calling number by reading data table 400 of FIG. 4, as described above in step 340.

At step 650, SPA 135 determines an estimated cost of the telephone call. In this illustrative embodiment, SPA 135 determines the estimated cost by reading data table 500 of FIG. 5, as described above in step 350.

At step 660, SPA 135 sends a message to SSP 125a containing the estimated cost. SSP 125a receives the message and audibly communicates the estimated cost to wire line telephone 110a. Preferably, the communication is accomplished with audible voice synthesis. For example, SSP 125 may communicate to wire line telephone 110a "The cost to complete this call is estimated at ['estimated cost #5']."

According to another embodiment of the present invention, at step 650, SPA 135 determines an estimated connection cost and an estimated per unit of time cost of the telephone call. Particularly, third segment 530 of data table 500 contains both an estimated connection cost and an estimated per unit of time cost and SPA 135 reads both estimated costs from data table 500. At step 660, SSP 125 may communicate to wire line telephone 110a "The cost to complete this call is estimated at ['estimated connection cost #5'] to connect and ['estimated per unit of time cost #5'] per minute."

According to a further embodiment of the present invention, a calling card number may be used to identify the calling plan. In this embodiment employing a calling card, at step 622, SN 140 broadcasts a prompt for a calling card number to telephone 110a and, at step 625, receives the calling card number from telephone 110a. At step 626, the calling card number is also sent to SPA 135. At step 640, SPA 135 determines the calling plan of the calling number based on data in data store 131. In this illustrative embodiment, this is accomplished by referencing a table of data containing calling plan information. For example, SPA 135 may read data table 700 of FIG. 7 to determine the calling plan.

Figure 7:
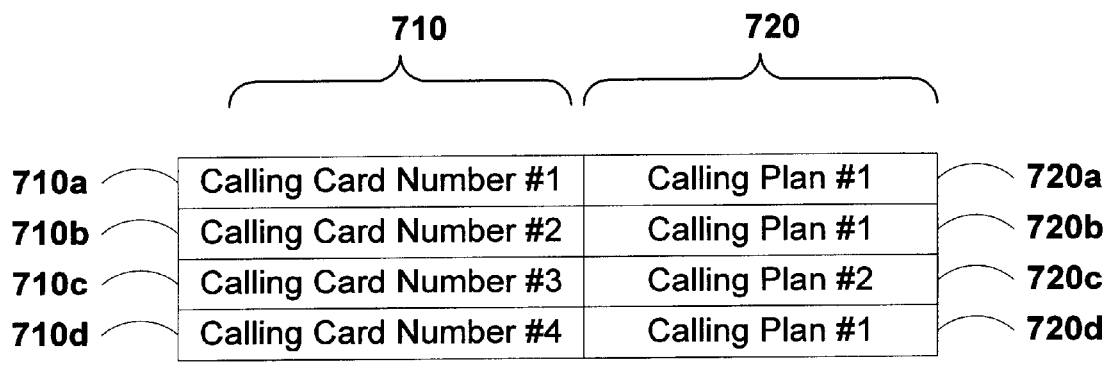
FIG. 7 is another data structure in accordance with one embodiment of the present invention, for use with the method of FIG. 6.

As shown in FIG. 7, data table 700 includes a first segment 710 and a second segment 720. The first segment 710 includes a plurality of data fields 710a through 710d, wherein each data field contains a calling card number. The second segment 720 includes a plurality of data fields 720a through 720d, wherein each data field contains a calling plan identification. Each data field of second segment 720 corresponds to a data field of first segment 710, thereby forming a mapping between calling card numbers and calling plans. As shown, 'calling card number #1' corresponds to 'calling plan #1,' 'calling card number #2' corresponds to 'calling plan #1,' 'calling card number #3' corresponds to 'calling plan #2,' and 'calling card number #4' corresponds to 'calling plan #1.'

Referring back to step 640 of FIG. 6, if the calling card number is 'calling card number #3,' SPA 135 searches first segment 710 of data table 700 for 'calling card number #3'. Once 'calling card number #3' is read in data field 710c, SPA 135 reads the corresponding entry in data field 720c, which has an entry of 'calling plan #2.'

In yet another embodiment of the present invention, the estimated cost is based on the telephone code of the telephone having the calling number and the telephone code of the telephone having the called number. In this embodiment, data table 700 of FIG. 7 includes another segment containing the telephone code of the telephone having the calling number. In this manner, the estimated cost is mapped from the telephone code of the telephone having the calling number and the telephone code of the telephone having the called number. Again, it is contemplated that other mappings may be used such as a relational database, a distributed database, a file, a spreadsheet, and the like.

In an another embodiment of the present invention, the calling line is a wireless telephone 210. Preferably, in this embodiment the wireless telephone system 200 is a wireless intelligent network (WIN). The devices of the wireless telephone system 200 are configured so that the present embodiment operates similarly to the above described embodiments originating in wire line telephone system 100. SCP 230 and SN 240 in wireless telephone system 200 are adapted analogously to SCP 130 and SN 140 in wire line telephone system 100.

Preferably, wire line telephone 110a is a customer of the local service provider. In this manner, billing to the calling party is simplified. Preferably, SCP 130 determines if the calling party is a customer of the local service provider. In this embodiment, SCP 130 receives the query from SSP 125 and SPA 135 determines whether the calling party is a customer of the local service provider. SPA 135 may determine that the calling party is a customer by analyzing information contained in the query message or by analyzing information contained in data store 131. Preferably, this is determined by comparing the calling party's telephone number to a list of telephone numbers representing the customers of the local service provider, referred to as the customer list. If the calling party's telephone number is in the customer list, then the party is a customer. Preferably, the customer list resides in data store 131. The present invention may end call processing if the calling party is not a customer.

It should be noted that the implementation of the present invention is not limited to AIN and WIN based networks, and other advanced or intelligent networks and arrangements may be used to implement the invention.

The invention may be embodied in the form of appropriate computer software or in the form of appropriate hardware or a combination of appropriate hardware and software. It is noted that the foregoing examples have been provided merely for the purpose of explanation and are in no way to be construed as limiting of the present invention. While the present invention has been described with reference to embodiments, it is understood that the words which have been used herein are words of description and illustration, rather than words of limitations. Further, although the invention has been described herein with reference to particular embodiments, the present invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method for estimating a cost of a long distance telephone call on a telephone system from a first telephone station having a calling number to a second telephone station having a called number, the method comprising:

receiving the called number from the first telephone station, the called number comprising a telephone code;

parsing the telephone code from the called number;

determining a calling plan identification; and determining the estimated cost based on the telephone code and the calling plan identification.

2. The method of claim 1 wherein parsing the telephone code comprises parsing an area code from the called number.

3. The method of claim 1 wherein parsing the telephone code comprises parsing a country code from the called number.

4. The method of claim 1 wherein determining the estimated cost comprises determining an estimated connection cost and an estimated per unit of time cost.

5. The method of claim 1 further comprising communicating the estimated cost to the first telephone station.

6. The method of claim 5 wherein communicating the estimated cost comprises communicating the estimated cost to the first telephone station via audible voice synthesis.

7. The method of claim 5 wherein communicating the estimated cost comprises communicating the estimated cost via numerical readings on a graphical display.

8. The method of claim 1 further comprising broadcasting a prompt to the first telephone station for connection to the second telephone station.

9. The method of claim 1 further comprising coupling the first telephone station to the second telephone station.

10. The method of claim 1 wherein determining a calling plan identification comprises determining a calling plan identification based on the called number.

11. The method of claim 1 wherein determining a calling plan identification comprises determining a calling plan identification based on a calling card number.

12. A method for estimating a cost of a long distance telephone call on a telephone system from a first telephone station having a calling number to a second telephone station having a called number in an advanced intelligent network comprising a service switching point electrically coupled to the first telephone station and a service control point electrically coupled to the service switching point, the service control point comprising a service package application and a data store, the method comprising:

receiving, at the service switching point, the called number from the first telephone station, the called number comprising a telephone code;

parsing, at the service control point, the telephone code from the called number;

determining, at the service control point, a calling plan identification; and determining, at the service control point, the estimated cost based on the telephone code and the calling plan identification.

13. The method of claim 12 wherein parsing the telephone code comprises parsing an area code from the called number.

14. The method of claim 12 wherein parsing the telephone code comprises parsing a country code from the called number.

15. The method of claim 12 wherein determining an estimated cost comprises determining an estimated connection cost and an estimated per unit of time cost.

16. The method of claim 12 further comprising communicating, from the service switching point to the first telephone station, the estimated cost.

17. The method of claim 16 wherein communicating the estimated cost comprises communicating, from the service switching point to the first telephone station, the estimated cost via audible voice synthesis.

18. The method of claim 16 wherein communicating the estimated cost comprises communicating, from the service switching point to the first telephone station, the estimated cost via numerical readings on a graphical display of the first telephone station.

19. The method of claim 12 further comprising broadcasting, from the service switching point to the first telephone station, a prompt for connection to the second telephone station.

20. The method of claim 12 further comprising connecting, by the service switching point, the first telephone station to the second telephone station.

21. The method of claim 12 wherein parsing comprises:
receiving, at the service control point, the called number; and
parsing, by the service package application, the telephone code from the called number.

22. The method of claim 12 wherein determining a calling plan identification comprises:
receiving, at the service control point, the calling number and
mapping, by the service package application, the calling number to a corresponding calling plan identification.

23. The method of claim 12 wherein determining the estimated cost comprises mapping, by the service package application, the telephone code and the calling plan identification to a corresponding estimated cost.

24. A method for estimating a cost of a long distance telephone call on a telephone system from a first telephone station having a calling number to a second telephone station having a called number in an advanced intelligent network comprising a service switching point electrically coupled to the first telephone station, a service control point electrically coupled to the service switching point, the service control point comprising a service package application and a data store, and a service node electrically coupled to the service switching point, the method comprising:
receiving, at the service switching point, a predefined telephone number from the first telephone station;
connecting the service switching point to the service node;
receiving, at the service node, the called number from the first telephone station;
sending, from the service node to the service control point, the called number;
receiving, at the service control point, the called number;
parsing, at the service control point, a telephone code from the called number;
determining, at the service control point, a calling plan identification; and
determining, at the service control point, the estimated cost based on the telephone code and the calling plan identification.

25. The method of claim 24 further comprising:
prompting, by the service node to the first telephone station, for a calling card number; and
receiving, at the service node from the first telephone station, a calling card number.

26. The method of claim 24 further comprising communicating, from the service node to the first telephone station, the estimated cost.

27. The method of claim 24 wherein communicating the estimated cost comprises communicating, from the service node to the first telephone station, the estimated cost via audible voice synthesis.

28. The method of claim 24 wherein determining the estimated cost comprises mapping, by the service package application, the telephone code and the calling plan identification to a corresponding estimated cost.

29. The method of claim 24 further comprising broadcasting, from the service node to the first telephone station, a prompt for connection to the second telephone station.

30. The method of claim 24 further comprising connecting, by the service node, the first telephone station to the second telephone station.

31. A method for estimating a cost of a long distance telephone call on a telephone system from a first telephone station having a calling number to a second telephone station having a called number in a wireless intelligent network comprising a mobile switching center electrically coupled to the first telephone station and a service control point electrically coupled to the mobile switching center, the service control point comprising a service package application and a data store, the method comprising:
receiving, at the mobile switching center, a predefined number from the first telephone station;
connecting the mobile switching center to the service node;
receiving, at the service node, the called number from the first telephone station;
sending, by the service node to the service control point, the called number;
receiving, at the service control point, the called number;
parsing, at the service control point, a telephone code from the called number;
determining, at the service control point, a calling plan identification; and
determining, at the service control point, the estimated cost based on the telephone code and the calling plan identification.

32. The method of claim 31 further comprising:
prompting, by the service node to the first telephone station, for a calling card number; and
receiving, at the service node from the first telephone station, a calling card number.

33. The method of claim 31 further comprising broadcasting, from the service node to the first telephone station, a prompt for connection to the second telephone station.

34. The method of claim 31 further comprising connecting, by the service node, the first telephone station to the second telephone station.

35. A system for estimating a cost of a long distance telephone call on a telephone system from a first telephone station having a calling number to a second telephone station having a called number, the system comprising:
a service switching point electrically coupled to the first telephone station;
a service control point electrically coupled to the service switching point; and
a service node electrically coupled to the service switching point through a first data link, and electrically coupled to the service control point through a second data link, the service node adapted to receive a called number from the first telephone station, the called number comprising a telephone code;
wherein the service control point parses the telephone code from the called number, determines a calling plan identification, and determines the estimated cost based on the telephone code and the calling plan identification.

36. The system of claim 35 wherein the service node is further adapted to prompt the first telephone station for a calling card number, and receive from the first telephone station the calling card number.

37. The system of claim 35 wherein the service node is further adapted to communicate the estimated cost to the first telephone station.

38. The system of claim 35 wherein the service node is further adapted to communicate the estimated cost to the first telephone station via audible voice synthesis.

39. The system of claim 35 wherein the service node is further adapted to broadcast to the first telephone station, a prompt for connection to the second telephone station.

40. The system of claim 35 wherein the service node is further adapted to connect the first telephone station to the second telephone station.

41. The system of claim 35 wherein the service control point comprises a data store and a service package application.

42. The system of claim 41 wherein the service package application is adapted to map the telephone code and the calling plan identification to a corresponding estimated cost.

43. A system for estimating a cost of a long distance telephone call on a wireless telephone system from a first telephone station having a calling number to a second telephone station having a called number, the system comprising:

a mobile switching center electrically coupled to the first telephone station;

a service control point electrically coupled to the mobile switching center; and a service node electrically coupled to the mobile switching center through a first data link, and electrically coupled to the service control point through a second data link, the service node adapted to receive a called number from the first telephone station, the called number comprising a telephone code;

wherein the service control point parses the telephone code from the called number, determines a calling plan identification, and determines the estimated cost based on the telephone code and the calling plan identification.

44. The system of claim 43 wherein the service node is further adapted to prompt the first telephone station for a calling card number, and receive from the first telephone station a calling card number.

45. The system of claim 43 wherein the service control point comprises and a data store and a service package application.

46. The system of claim 45 wherein the service package application is adapted to map the telephone code and the calling plan identification to a corresponding estimated cost.

* * * * *